United States Patent [19]
Kowalski

[11] Patent Number: 5,977,990
[45] Date of Patent: *Nov. 2, 1999

[54] PARALLEL COMPUTER FOR REAL TIME MAP SYNTHESIS

[75] Inventor: Stephen V. Kowalski, Rancho Palos Verdes, Calif.

[73] Assignee: Northrop Grumman Corporation, Los Angeles, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/885,209

[22] Filed: Jun. 30, 1997

[51] Int. Cl.[6] .................................................... G06T 1/20
[52] U.S. Cl. .......................... 345/506; 345/505; 345/508; 345/113
[58] Field of Search .................................. 345/506, 505, 345/508, 435, 113; 701/207, 209

[56] References Cited

U.S. PATENT DOCUMENTS

| | | | |
|---|---|---|---|
| 4,661,811 | 4/1987 | Gray et al. ............................... | 345/113 |
| 4,682,160 | 7/1987 | Beckwith, Jr. et al. . | |
| 4,815,012 | 3/1989 | Feintuch . | |
| 4,825,381 | 4/1989 | Bottorf et al. .......................... | 345/508 |
| 4,857,905 | 8/1989 | Ogawa .................................... | 345/113 |
| 4,876,651 | 10/1989 | Dawson et al. . | |
| 5,010,515 | 4/1991 | Torborg, Jr. . | |
| 5,046,023 | 9/1991 | Katsura et al. . | |
| 5,177,624 | 1/1993 | Sato ........................................ | 345/113 |
| 5,261,030 | 11/1993 | Brooke et al. . | |
| 5,293,481 | 3/1994 | Mita et al. . | |
| 5,386,370 | 1/1995 | Woo . | |
| 5,392,292 | 2/1995 | Fischer et al. . | |
| 5,408,606 | 4/1995 | Eckart . | |
| 5,426,725 | 6/1995 | Kilgore ................................... | 345/113 |
| 5,434,968 | 7/1995 | Kunii et al. ............................. | 345/505 |
| 5,454,073 | 9/1995 | Fukushima et al. . | |
| 5,459,826 | 10/1995 | Archibald . | |
| 5,471,567 | 11/1995 | Soderberg et al. . | |
| 5,471,579 | 11/1995 | Kimura et al. . | |
| 5,543,824 | 8/1996 | Priem et al. ............................ | 345/508 |

*Primary Examiner*—Kee M. Tung
*Assistant Examiner*—Sy D. Luu
*Attorney, Agent, or Firm*—Terry J. Anderson; Karl J. Hoch, Jr.

[57] ABSTRACT

A parallel computer synthesizes a digital map. The computer includes a first stage and a second stage. The first stage includes a background processor for generating a map background image and N overlay processors for generating first through Nth map overlay images of non-relocatable map features. First and second sets of interim buffers are alternately connected to the background processor and to the N overlay processors. The second stage includes a second stage processor connected to the output of the first and second sets of interim buffers for combining, according to a predetermined priority, the overlay images generated by the processors of the first stage to generate a composite map image. The second stage processor also generates a final map overlay image of relocatable features, and combines the composite map image with the overlay image of relocatable features to generate a display map image. A pair of output buffers is connected to the output of the second stage processor so that each buffer of the pair is alternately connected to the processor.

11 Claims, 3 Drawing Sheets

PARALLEL COMPUTER FOR REAL TIME MAP SYNTHESIS

BACKGROUND OF THE INVENTION

The present invention relates to generating and displaying graphical images such as maps. The present invention is particularly useful to synthesize and display digital maps in real time.

A pilot flying an aircraft needs current, accurate information about the areas over which the aircraft is flying. The pilot often needs to know where towns, roads, bodies of water (lakes, rivers, etc.), and other natural and human features of the landscape are located. In some instances, it is also important for the pilot to know where political boundaries are located.

Traditionally, pilots have relied on maps, generally paper maps. However, paper maps may be cumbersome in cramped aircraft cockpits. In addition, the pilot must keep track of where the aircraft is relative to the features shown on the map.

Computer generated maps may be displayed in the cockpit. Such computer-generated maps eliminate the need for the pilot to continually refer to one or more paper maps. In addition, the computer can be programmed to identify on the display the position of the aircraft relative to the features shown on the map. Furthermore, the computer can identify the area over which the aircraft is to fly next, and generate and display a map for that region, relieving the pilot of the need to pull a separate paper map from a file.

Digital maps can be synthesized from vector data. However, generating such maps incorporating all the features of the area over which the aircraft is flying is a time-consuming task. Thus, it has been difficult to generate such maps in "real time" to create a moving map to display in the aircraft cockpit. However, to be useful to a pilot, a map displayed in the cockpit must be generated and displayed in real time. Therefore, there exists a need for a system to generate a moving map display in real time such as could be used by the pilot of an aircraft.

SUMMARY OF THE INVENTION

The present invention is a computer for generating an image, wherein the image comprises a plurality of layers of graphical information. The computer comprises N+1 first stage image processors connected in parallel. Each first stage processor generates a graphical image layer. A second stage image processor is connected to the outputs of the first stage processors. The second stage processor combines the graphical image layers generated by the first stage processors to create a display image.

More specifically, the invention comprises a parallel computer for synthesizing a digital map. The computer includes a first stage and a second stage. The first stage includes a background processor for generating a map background image and N overlay processors for generating first through Nth map overlay images of non-relocatable map features. First and second sets of interim buffers are alternately connected to the background processor and the N overlay processors. The second stage includes a second stage processor connected to the output of the first and second sets of interim buffers for combining, according to a predetermined priority, the overlay images generated by the processors of the first stage to generate a composite map image. The second stage processor also generates a final map overlay image of relocatable features, and combines the composite map image with the overlay image of relocatable features to generate a display map image. A pair of output buffers is connected to the output of the second stage processor so that each buffer of the pair is alternately connected to the processor.

An object of the present invention is to generate maps in real time for display in a moving vehicle, such as an aircraft.

An object of the present invention is to provide a two stage pipeline processor in which parallel image processors of a first set generate graphical overlay images, and a second stage processor combines the graphical overlay images.

An object of the present invention is to provide a parallel set of image generating processors, each of which generates a graphical image, and a second image processor for combining the graphical images generated by the parallel image generating processors.

An object of the present invention is to generate a graphical image by generating layers of graphical information in parallel image generating processors, and then combining the generated layers of graphical information into a graphical image for display.

DETAILED DESCRIPTION OF THE PREFERRED EMBODIMENT

The present invention is described in the context of an embodiment for generating and displaying a map image, such as could be used in an aircraft.

Figure 1:
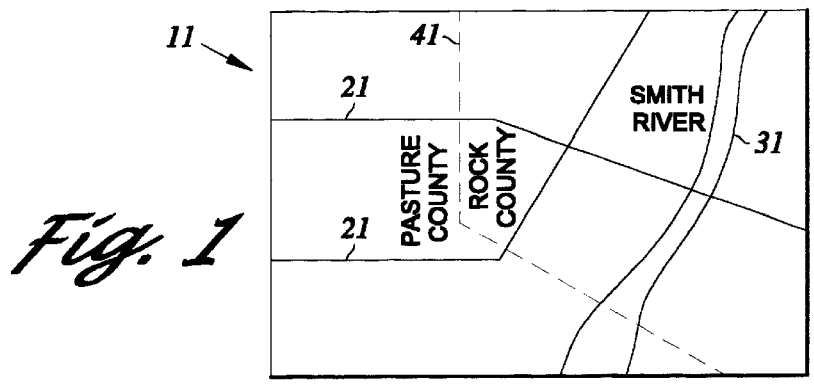
FIG. 1 is a hypothetical map to be displayed by a computer of the invention.

A map graphically displays information about a region, such as an area of the earth's surface. A map may appear such as is shown in FIG. 1. The map may show the location of natural features such as bodies of water (rivers, lakes, and oceans), mountains, etc. The map may also show human creations of the landscape, such as roads, bridges, towns, buildings, etc. Furthermore, the map may show features that do not appear on the earth's surface, but may be important to a pilot, such as political boundaries, time zones, etc.

The hypothetical map 11 shown in FIG. 1 shows some roads 21, a river 31, and a political boundary 41 between counties.

In accordance with the present invention, the graphical image of the map may be rendered as a plurality of graphical image layers. For example, the layers may include a background for the region depicted in the map, such as the blue for an ocean, brown for the ground, etc. Another image layer may include certain natural features such as rivers, ponds, etc. in the region. An additional image layer may include features such as towns. Yet another image layer may depict roads. Further layers may depict whatever other features are desired to be displayed, such as political boundaries, buildings, etc.

Figure 2A:
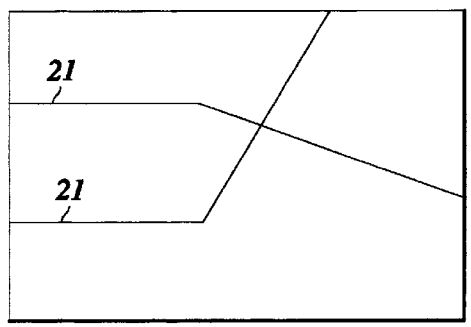
FIGS. 2a–f are drawings of the image layers that may comprise the hypothetical map shown in FIG. 1.
Figure 2B:
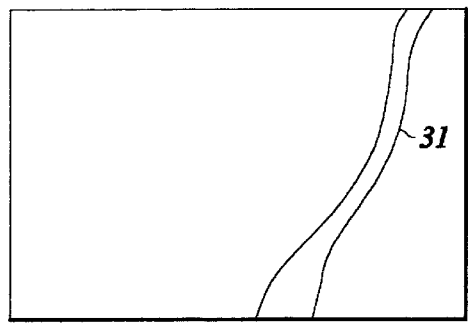
Figure 2C:
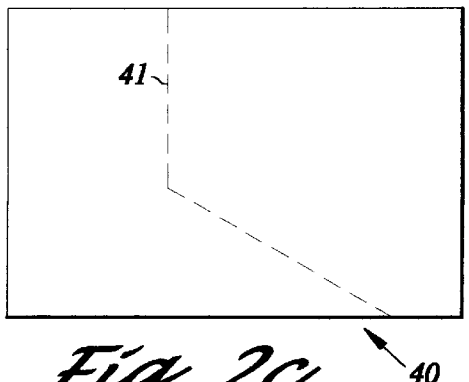
Figure 2D:
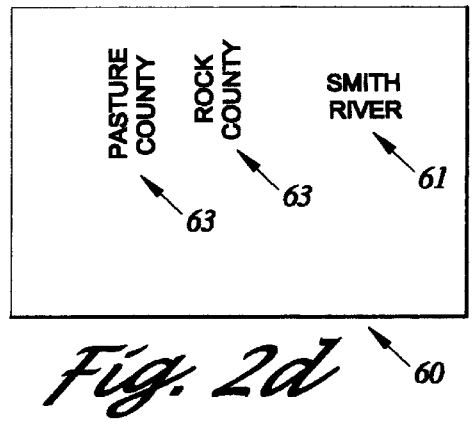

FIGS. 2a–2d illustrate the graphical image layers that form the hypothetical map of FIG. 1. FIG. 2a shows the graphical overlay layer 20 containing the roads 21. FIG. 2b shows the graphical overlay layer 30 that contains the river 31. FIG. 2c shows the layer 40 that contains the political boundary 41. FIG. 2d shows an overlay image 60 with names 61, 63 that relate to some of the features on the map.

Figure 3:
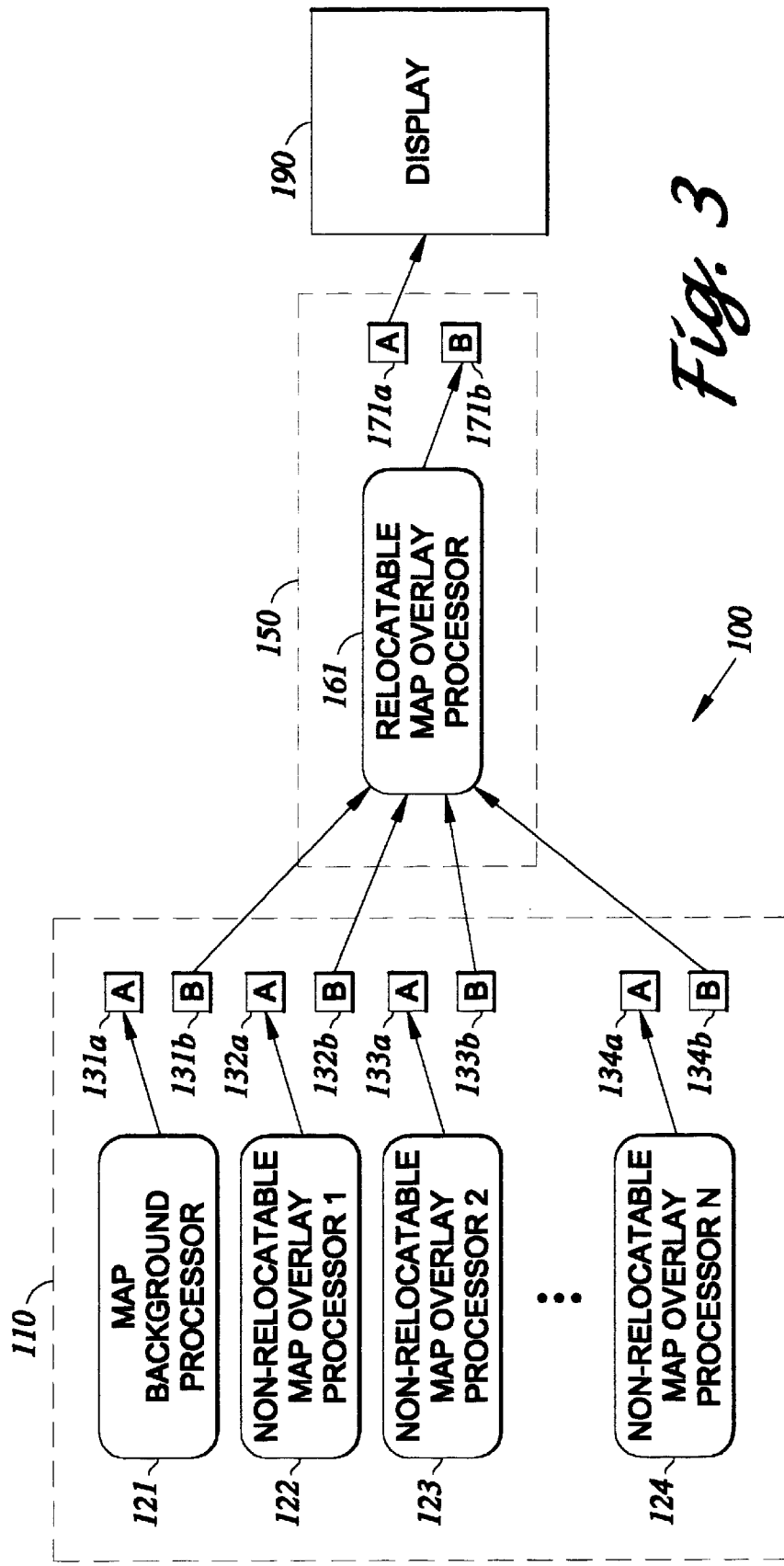
FIG. 3 is a block diagram of an image synthesis system incorporating the present invention.

In accordance with the present invention, a two stage pipeline processor generates a graphical image from a plurality of graphical image layers. As shown in FIG. 3, the pipeline processor 100 includes a first stage 110 that comprises a plurality of parallel processors, each of which generates one graphical image layer. A second stage 150 includes a second stage processor 161 that combines the image layers generated by the first stage processors, and may add an additional image layer. A display 190 receives the combined image and displays it to the pilot or other system user.

FIRST STAGE PROCESSORS

In the illustrated embodiment of the system, the first stage includes N+1 parallel processors 121–124 for generating a background image layer and N overlay images 20, 30, 40. The image layers rendered by the first stage processors are the images of non-relocatable images, which are the images that must maintain a fixed relationship with respect to each other. The parallel processors simultaneously render the layers for a single map image.

The processors may be general purpose microprocessors. Alternatively, improved performance may often be obtained by using special purpose microprocessors.

The processors are programmed in a conventional manner as will be understood by those skilled in the art, to generate the different image layers. Additional information relating to programming such information into processors is generally available from numerous sources relating to graphical information systems (GIS).

A first processor 121 may be a map background processor. The background processor generates the map background for the region depicted in the map. For example, the background may be blue for an ocean or brown or green for the ground.

Another processor 122 may be a first non-relocatable map overlay processor. The first overlay processor generates an image layer of map features that must be in a particular spatial relationship with respect to other map features. For example, the first overlay processor may render an image layer containing roads, such as the overlay image 20 shown in FIG. 2a.

Another processor 123 may be a second non-relocatable map overlay processor. The second-overlay processor generates an image layer of other fixed location features, such as rivers. For example, the second overlay processor may generate the overlay image 30 shown in FIG. 2b. As is apparent, when the image layers from the first and second overlay processors are combined, the image of the rivers and the image of the roads must be carefully aligned. However, since the image layers can be rendered independently, the image layers can be developed in parallel by different processors.

Other processors generate additional image layers of other non-relocatable features. The term "non-relocatable" is used to designate those features that have a fixed spatial relationship with respect to each other. Such fixed features may include towns, bridges, buildings, etc. The Nth overlay processor 124 may, for example, render a map image layer of political boundaries, such as the overlay image shown in FIG. 2c.

INTERIM FRAME BUFFERS

The output of each first stage processor is connected to a corresponding pair of interim frame buffers 131–134. Each interim frame buffer of the pair is alternately connected to the output of the corresponding first stage processor. Thus, there are two sets of interim frame buffers, a set of A interim buffers 131a–134a, and a set of B interim buffers 131b–134b. Each set contains N+1 interim frame buffers. In one time period, the A interim buffer of each pair is connected to the output of the corresponding first stage processor 121–124, and in the alternating time period, the B interim buffer of each pair is connected to the output of the corresponding first stage processor 121–124.

The alternating connection to the interim frame buffers creates a double buffering scheme so that one set of image layers may be generated and stored-in the interim frame buffers while another set of image layers that was previously generated is output to the second stage processor.

Specifically, during a first time period, each of the N+1 interim frame buffers of the first set (the A interim buffers 131a–134a) is connected to the output of the corresponding first stage processor 121–124. The first stage processors generate the layer images for a first frame of the map image and write those layer images of the first frame to the corresponding interim buffers A. Thus, the first frame image layers are stored in the interim frame buffers A.

During the next (second) time period, the interim frame buffers of the first set (the A interim buffers) are connected to the input of the second stage processor. The image layers generated and stored in the first time period are read out to the second stage processor 161. During this second time period, each of the N+1 interim frame buffers of the second set (the B interim buffers 131b–134b) is connected to the output of the corresponding first stage processor 121–124. During that second time period, the first stage processors 121–124 generate the layer images for a second frame of the map image and write those layer images of the second frame to the corresponding B interim buffers 131b–134b.

During a third time period, subsequent to the second time period, the interim frame buffers of the second set (the B interim buffers 131b–134b) are connected to the input of the second stage processor 161. The image layers generated and stored in the second time period are output to the second stage processor during this third time period. During this third time period, the first stage processors 121–124 generate the layer images for a third frame of the map image, and store those layer images of the third frame in the corresponding interim buffers of the first set (the A interim buffers 131a–134a).

SECOND STAGE PROCESSOR

The second stage processor 161 combines the previously generated image layers according to a predetermined priority to generate a composite map image frame.

The second stage processor may also be a general purpose microprocessor. Alternatively, improved performance may often be obtained by using a special purpose microprocessor.

The second stage processor 161 is programmed in a conventional manner as will be understood by those skilled in the art, to combine the layers in accordance with the appropriate priority. Higher priority layers are drawn on top of lower priority layers.

The predetermined priority for combining the image layers to obtain the composite image determines which image layers are displayed on top. For example, the priority protocol may dictate that roads are always drawn or displayed on top of rivers. Thus, if the first overlay processor 122 generates the image layer of roads, and the second overlay processor 123 generates the image layer of rivers, the protocol of the second stage processor 161 may be that the second overlay image 30 is displayed on top of the first overlay image 20. The predetermined priority is fixed, either in the system hardware, or in the software implementation of the system parameters for a particular display.

Figure 2E:
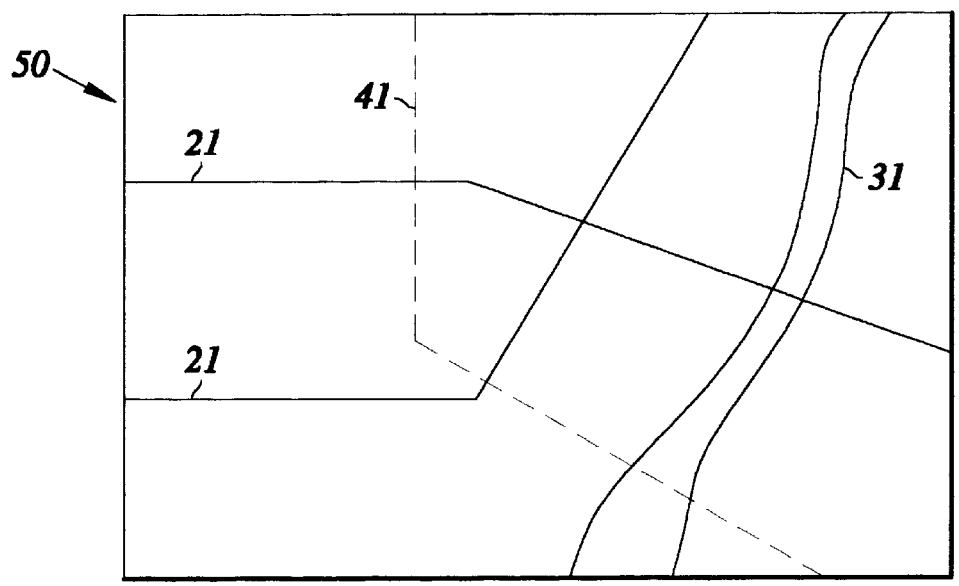

The composite map image formed by combining the non-relocatable images may appear as shown in FIG. 2e. As can be seen, all the fixed features to be shown on the map (the roads 21, the river 31, and the political boundary 41) are in the composite image 50.

The second stage processor 161 may also generate relocatable objects to be displayed on the final map image, and render those objects on top of the composite image frame to be displayed to the pilot or other user.

Relocatable objects are objects that do not need to be displayed in an exact position on the map. Relocatable objects may be relocated to avoid obscuring some portion or feature of the composite image. For example, it is not necessary to always draw the name of a city or other map feature directly top of that feature's center. The name of a city or other feature may be moved slightly so that it is not drawn on top of a river or road.

Referring to FIG. 2d, an overlay image containing an exemplary (hypoethetical) set of relocatable objects is shown. The set includes the name 61 for the river 31 that appears in the second overlay image 30 (FIG. 2b). Also appearing are the names of the political entities delineated by the political boundary 41 that appears in the Nth overlay image 40 (FIG. 2c).

Figure 2F:
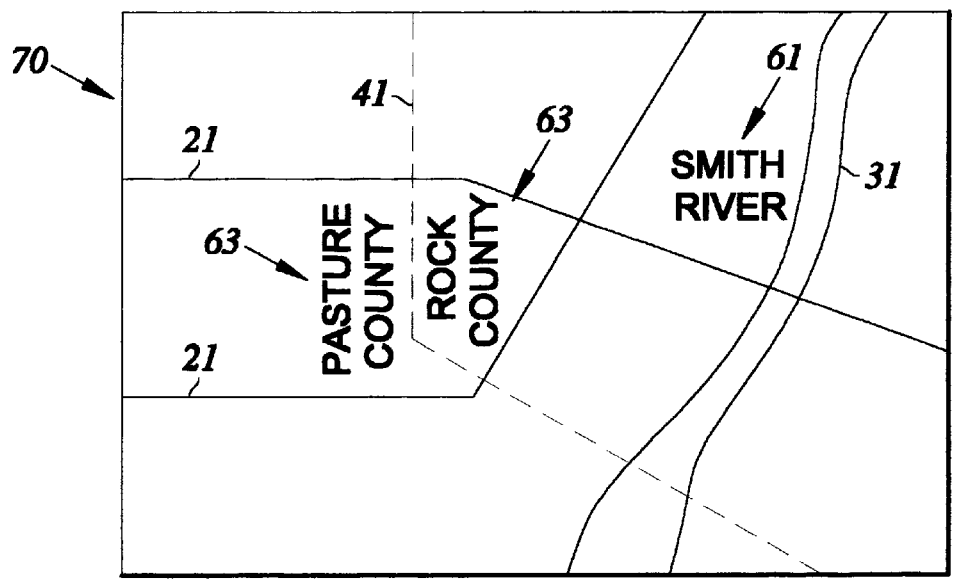

FIG. 2f shows the created map image with relocatable objects added. As can be see by comparing FIG. 2e with FIG. 2f, the names 63 of the political subdivisions have been relocated to avoid having them cover the road 21.

The positioning of the relocatable objects 61, 63 should take into account the positions of the non-relocatable map features 21, 31, 41, to minimize overwriting that would cover those map features. Therefore, the rendering of the image layer with relocatable objects is not independent of the rendering of the images containing the non-relocatable features. For that reason, the addition of the relocatable objects 61, 63 to the composite image is best not done by the parallel processors 121–124. Rather, the addition of the relocatable objects should be made as part of, or subsequent to, the combining of the non-relocatable images 20, 30, 40 to the composite image 50.

A variety of techniques are known in the field for generating the relocatable objects and moving them in the image. By virtue of their relocatable nature, it is not necessary that they be positioned with absolute precision. Therefore, most of the commonly known methods provide acceptable levels of accuracy.

As noted above, the two sets of interim frame buffers create a double buffering scheme between the first stage 110 and the second stage 150.

During the second time period described above, the second stage processor 161 combines the map background and overlay images 20, 30, 40 generated during the first time period to generate a first composite map image 50. In this second time period, the second stage processor 161 reads those image layers from the first set of interim buffers 131a–134a (the A set).

During the third time period, the second stage processor 161 combines the map background and overlay images 20, 30 40 generated during the second time period to generate a second composite map image. In this third time period, the second stage processor 161 reads the image layers from the second set of interim buffers 131b–134b (the B set).

During the second time period, the second stage processor 161 may also add the relocatable objects 61, 63 to the first composite map image 50, to create a first display map image 70 (FIG. 2f). During the third time period, the second stage processor may add the relocatable objects to the second composite map image, to create a second display map image.

OUTPUT FRAME BUFFERS

A pair of output frame buffers 171a, 171b is connected to the output of the second stage processor 161. Each output frame buffer is alternately connected to the second stage processor, to create a double buffering scheme for the final map images 70.

While the second stage processor is writing one map image frame to the first output frame buffer, the display is reading the previous map image frame from the second output frame buffer. Thus, during the second time period noted above, the second stage processor is generating a first display map image and writing that first display image in the first output buffer. During the third time period, the second stage processor is generating a second display map image. The second stage processor writes that second display map image to the second output frame buffer.

DISPLAY

The display map image 70 that is the result of combining the different map image layers is displayed to the pilot or other user on a conventional display 190. For example, the display 190 may be a cathode ray tube (CRT), or a flat panel liquid crystal display (LCD).

As noted above, the display 190 reads each frame of the combined map image alternately from the first and second output frame buffers 171a, 171b. During the time that the second stage processor 161 is writing a first map image frame to the first output frame buffer 171a, the display 190 is reading from the second output frame buffer 171b the previous map image.

Thus, during the second time period, the second stage processor 161 generates the first display image and writes that first display image to the first output frame buffer 171a. During the third time period, the second stage processor generates the second display image and writes that second display image to the second output frame buffer 171b. Also during that third time period, the display 190 reads the first display image from the first output frame buffer 171a. During a fourth time period, subsequent to the third time period, the display 190 reads from the second output frame buffer 171b the second display image.

Using the apparatus and method described, a moving map can be generated and displayed in real time. Those skilled in the art will recognize that various modifications may be made to the embodiment described above without departing from the spirit of the invention. In addition, although the embodiment was described in the context of generating a map, those skilled in the art will recognize that other graphical images may be generated and displayed in a similar manner.

What is claimed is:

1. A computer for generating a map to display, wherein the map image comprises a plurality of layers of graphical information, the computer comprising:

N+1 first stage image processors connected in parallel, wherein a first first stage image processor generates a map background image layer; a second first stage processor generates a road image layer; and a third first stage processor generates a water bodies image layer;

a first set of N+1 interim frame buffers, each of which is connected during a first time to the output of the corresponding image processor for receiving from that corresponding first stage processor the graphical image layer generated by that processor during the first time;

a second set of N+1 interim frame buffers, each of which is connected during a second time to the output of the corresponding image processor for receiving from that corresponding first stage processor the graphical image layer generated by that processor during the second time;

a second stage image processor for combining the image layers according to a predetermined protocol regarding the order in which the image layers are overlaid; adding to each composite image an additional image layer of names for at least some of the features generated by first stage image processors; and positioning objects in the additional image layer to minimize the overlap between those objects and features of the composite image wherein:

during the second time the second stage processor is connected to the outputs of the interim frame buffers of the first set for combining the graphical image layers generated during the first time to create a first composite image;

during a third time the second stage processor is connected to the outputs of the interim frame buffers of the second set for combining the graphical image layers generated during the second time to create a second composite image.

2. The computer of claim 1, wherein the second stage processor additionally generates a final graphical image layer and combines the final image layer with the graphical image layers generated by the first stage image processors.

3. The computer of claim 1, additionally comprising a display connected to the output of the second stage image processor for displaying the combined map image.

4. The computer of claim 1, additionally comprising a display connected to the output buffers for displaying the map image from the output buffers.

5. A method of generating a digital map, comprising:

generating in a first first stage background processor: a map background image for a first map frame;

generating in a second first stage background processor: road images;

generating in a third first stage background processor: images of water bodies;

generating in each of N first stage processors connected in parallel to each other and in parallel with the first stage background processor a non-relocatable map overlay image for the first map frame;

storing each of the background image and map overlay images for the first map frame in a first set of interim frame buffers;

generating in a second stage processor an image of names for at least some feature of the image layers generated by the second and third first stage processors;

combining in a second stage processor the background image and map overlay images for the first map frame from the first set of interim frame buffers according to a set of priority among the N map overlay images; and simultaneous with the step of combining the images of the first map frame:

generating in the first stage background processor a map background image for a second map frame;

generating in each of N first stage processors connected in parallel to each other and in parallel with the first stage background processor a non-relocatable map overlay image for the second map frame;

storing each of the background image and map overlay images for the second map frame in a second set of interim frame buffers.

6. A computer for generating a map to display, wherein the map image comprises a plurality of layers of graphical information, the computer comprising:

N+1 first stage image processors connected in parallel, wherein a first first stage image processor generates a map background image layer; a second first stage processor generates a road image layer; and a third first stage processor generates a water bodies image layer;

a first set of N+1 interim frame buffers, each of which is connected during a first time to the output of the corresponding image processor for receiving from that corresponding first stage processor the graphical image layer generated by that processor during the first time;

a second set of N+1 interim frame buffers, each of which is connected during a second time to the output of the corresponding image processor for receiving from that corresponding first stage processor the graphical image layer generated by that processor during the second time;

a second stage image processor for adding to each composite image an additional image layer of names for at least some of the features generated by first stage image processors wherein:

during the second time the second stage processor is connected to the outputs of the interim frame buffers of the first set for combining the graphical image layers generated during the first time to create a first composite image;

during a third time the second stage processor is connected to the outputs of the interim frame buffers of the second set for combining the graphical image layers generated during the second time to create a second composite image.

7. The computer of claim 6 wherein said second stage image processor combines the image layer according to a predetermined protocol regarding the order in which the image layers are overlayed.

8. The computer of claim 6 wherein said second stage image processor positions objects in the additional image layer to minimize the overlap between those objects and features of the composite image.

9. The computer of claim 6, wherein the second stage processor additionally generates a final graphical image layer and combines the final image layer with the graphical image layers generated by the first stage image processors.

10. The computer of claim 6, additionally comprising a display connected to the output of the second stage image processor for displaying the combined map image.

11. The computer of claim 6, additionally comprising a display connected to the output buffers for displaying the map image from the output buffers.

* * * * *